Figure 2:
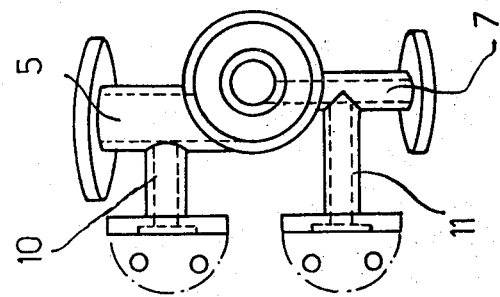

United States Patent [19]
Cariou et al.

[11] 3,844,721
[45] Oct. 29, 1974

[54] REACTOR SUITABLE FOR REACTIONS BETWEEN TWO FLUIDS

[75] Inventors: Jean M. Cariou, Tarnos; Jean Juhasz, Biarritz, both of France

[73] Assignee: Etablissements Gardinier, Neuilly-sur-Seine, France

[22] Filed: Mar. 13, 1973

[21] Appl. No.: 340,707

[30] Foreign Application Priority Data
Sept. 20, 1972 France .................... 72.33271

[52] U.S. Cl. .................... 23/259.2, 23/284, 23/291, 137/604, 259/4, 261/71, 261/79 A
[51] Int. Cl. .................... C05b 1/10, B01f 15/00
[58] Field of Search .......... 23/259.2, 291, 283, 284; 423/305, 309; 259/4; 261/79 A, 71; 137/604

[56] References Cited
UNITED STATES PATENTS

| | | | |
|---|---|---|---|
| 2,528,514 | 11/1950 | Harvey et al. | 23/259.2 X |
| 2,890,929 | 6/1959 | Rummert | 23/284 X |
| 3,105,778 | 10/1963 | Anderson | 261/79 A X |
| 3,175,888 | 3/1965 | Krejci | 23/259.5 |
| 3,246,883 | 4/1966 | Ashbrook | 259/4 X |

*Primary Examiner*—Joseph Scovronek
*Assistant Examiner*—Arnold Turk
*Attorney, Agent, or Firm*—Woodhams, Blanchard and Flynn

[57] ABSTRACT

A reactor comprises an outer tubular member having an inner tubular member disposed therein at one end thereof. A first tangential inlet supplies one reactant fluid into the annular zone defined between the inner and outer tubular members. A second tangential inlet having an axially movable piston valve associated therewith supplies another reactant fluid at a controllable rate into the inner tubular member.

4 Claims, 2 Drawing Figures

PATENTED OCT 29 1974　　　　　　　　　　　　　3,844,721

REACTOR SUITABLE FOR REACTIONS BETWEEN TWO FLUIDS

The present invention relates to a reactor suitable for reactions between two fluids, of the type comprising a cylindrical casing forming a first channel, provided with an intake pipe for a first fluid, and a second channel leading coaxially into the first and provided with an inlet pipe for a second fluid, means being provided for imparting a helical movement to the two fluids and ensuring the mixing thereof.

In the known reactors of this type, which are used particularly for promoting the mixing and reaction of ammonia and phosphoric acid, the means for imparting a helical movement to the fluids comprise at least one channel defined between a helical groove on the periphery of a revolving mass and a cylindrical casing, which channel is fed with the two fluids.

These known reactors have several disadvantages. In effect, the helical grooves in the revolving mass are prone to corrosion and there is a risk of blockage as soon as the flow of original material exceeds a critical value so that the possible applications of these reactors are limited. In particular, the reactors with helical grooves can only be operated with difficulty when it is desired to produce more than 5 tons per hour of ammonium phosphate.

The object of the present invention is to overcome these disadvantages and, for this purpose, it relates to a reactor of the type defined above, in which the means provided for imparting a helical movement to the fluids are formed by the arrangement of inlets which lead tangentially into their respective pipes.

Owing to this arrangement, the fluids fed into the reactor each flow spontaneously in a helical stream, in a manner known per se. Consequently, the simplified reactor according to the invention eliminates the problem of corrosion, blockage and soiling mentioned above and permits greater flexibility in the flow rate of the raw materials.

The result is that this reactor is preferred to reactors with helical chambers, particularly for production in excess of 5 tons per hour.

The pipes for the intake of the two fluids may be arranged in such a manner that the helical flow of both fluids is in the same direction, for example, both rotating in a clockwise direction, or in the opposite direction.

The inlet of the first pipe extends advantageously along the free end of the second pipe, taking into consideration the direction of flow of the fluids.

Therefore, as soon as it enters the reactor, the second fluid comes into contact with the first fluid which is already activated by a helical movement.

In a practical embodiment of the reactor according to the invention, the closed end of the second pipe is closed by a movable piston which is controllable by means of a hand wheel and capable of more or less sealing the orifice by which the inlet of the second fluid is connected to said pipe.

This piston makes it possible to adjust the flow of the second fluid relative to the flow of the first fluid.

Finally, each of the inlets is preferably provided with means for admitting hot water or water vapour for preheating and cleaning the reactor.

Figure 1:
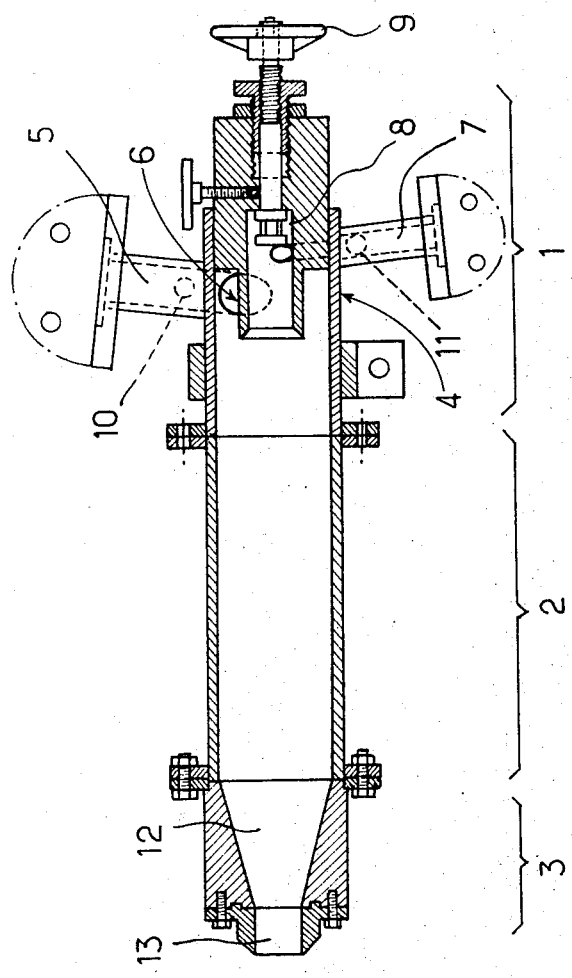

An embodiment of the invention is described below with reference to the accompanying drawing, in which:

FIG. 1 is a longitudinal section; and
FIG. 2 is a side view of the reactor.

With reference to FIG. 1, it appears that the reactor consists of three parts, namely: a section 1 supporting the pipes for admitting the raw materials, a reaction chamber 2 and a device for evacuating the products 3.

The section 1 comprises essentially two coaxial pipes 4 and 6, provided with tangential pipes 5 and 7, respectively, the pipe 5 being fitted on the outer pipe 4 leading upstream from the free end of the pipe 6 taking into consideration the direction of flow of the products.

Moreover, the said pipes are provided with tubes 10 and 11 for injecting either hot water or vapour. The closed end of the inner pipe 6 is sealed by a movable piston 8 which can be controlled by means of a hand wheel 9 and is capable of more or less sealing the orifice between tangential pipe 7 and inner pipe 6.

With reference to the reaction chamber 2, it is formed by a cylindrical casing which is an extension of the pipe 4.

Finally, the device for evacuating products consists of a reduction chamber 12 and a nozzle outlet 13.

By way of example, for the production of 800 kg/hr of dry ammonium phosphates, it is possible to use a stainless steel reactor having the following features:

Total length: ≈ 80 cm
External diameter: ≈ 12 cm
Diameter of reaction chamber: ≈ 10 cm
Total weight 20 to 30 kg approximately.

The reactor operates in the following manner:

Vapour is injected through the pipes 10 and 11 to preheat the reactor. Then, ammonia and pulverized phosphoric acid, of which the concentration of $P_2O_5$ varies from 28 to 60 per cent, are admitted through the pipes 5 and 7, respectively. The fluids flow into the reactor at approximately the same pressures, usually between 2 and 10 bars, however a slight over-pressure of phosphoric acid relative to the ammonia is preferred.

The flow rate of phosphoric acid is adjusted relative to the rate of ammonia, by means of the piston 8 which is controlled by the hand wheel 9.

The two fluids flow into the reactor with a tangential impulse so that they describe a helical course therein. Therefore, in the reaction mass which is relatively large in relation to the dimensions of the reactor, the phosphoric acid and ammonia are thoroughly mixed so that they only remain in the reaction chamber for a short time. To be more precise, this time varies from one tenth of a second to 1 second, approximately.

At the end of the reaction chamber, the reaction mixture passes into the reduction chamber 12 which permits the continuous flow of the formed/ammonium phosphates which are in a very divided anhydrous liquid form.

In a case where a reaction takes place at temperatures of less than 120°C, it is possible to obtain orthophosphates which can be crystalized immediately after leaving the reactor.

If the formed products are at a temperature of more than 260°C, melted ammonium polyphosphates are obtained and can be used in the form of a polyphosphoric liquid.

After use, the reactor is cleaned by circulating vapour injected into the pipes 10 and 11.

Several examples illustrating the use of the reactor according to the invention are described below:

Example 1

When supplied with phosphoric acid having a strength of less than or equal to 52 per cent of $P_2O_5$ and with ammonia, the reactor makes it possible to obtain ortho-phosphates at temperatures less than or equal to 150°C.

Therefore, with phosphoric acid at 50 per cent of $P_2O_5$ and ammonia, both at a pressure of 6 to 7 bars, the reactor according to the invention makes it possible to obtain approximately 800 kg/hr of monoammonium phosphates having a strength of:

$N_2$: 12 per cent
$P_2O_5$: 52 per cent with a flow regulating margin of ±25 per cent.

Example 2

When supplied with a sufficiently concentrated quantity of phosphoric acid, having a strength greater than or equal to 52 percent of $P_2O_5$ and with ammonia, the reactor directly produces ammonium polyphosphates and eliminates the difficult problem of the foam phase due to the presence of organic substances in the acids derived from phosphate ore deposits not subjected to calcination, which are normally used by the fertilizer industry.

Therefore, by causing a 56 per cent solution of phosphoric acid and ammonia to react at a pressure of 7 bars, there is obtained 1,400 kg/hr of ammonium polyphosphates having a strength of:

$N_2$: 11 per cent
$P_2O_5$: 58 per cent having a ratio of (polyphosphoric $P_2O_5$/total $P_2O_5$) which is adjustable between 20 and more than 50 per cent as a function of the temperature of the reagents admitted into the reactor. This proportion is approximately 20 per cent if the phosphoric acid and ammonia are cold, and is greater than or equal to 50 per cent if the phosphoric acid and ammonia are preheated to 100°C.

The reactor according to the invention may be used: either as a principle reactor in units for producing liquid fertilizers in which it produces the necessary polyphosphates.

The following test may be cited by way of example: 103 kg of $P_2O_5$ in the form of a 55 per cent solution of phosphoric acid having a temperature of 80°C is allowed to react with 25 C, of ammonia at a temperature of 25°Cq both at a pressure of 7 to 8 bars, in the reactor according to the invention. The temperature of the polyphosphates obtained is between 240 and 260°C. The reactor directly feeds a dissolving tank containing 118 litres of water into which a solution of ammonia (12 kg) has been admitted. Finally, there was obtained 302 kg of solution having an increased percentage of polyphosphate and a strength of 10 per cent of $N_2$ and 34 per cent of $P_2O_5$. Or as an auxiliary reactor for conventional granulating means provided with a rotating tube, a plate, etc. . . . in which it produces, in the form of ortho-phosphates or polyphosphates of ammonium, a complement of highly concentrated products or even the quantity of ammonium phosphate necessitated by formulation.

The following test may be cited by way of example: A reactor of the type described in accordance with the invention is positioned directly in a rotary granulating tube and fed with a 48 per cent solution of phosphoric acid $P_2O_5$ and with liquid ammonia, both at a pressure of 6 bars. In these conditions there is obtained 2,000 kg/hr of mono-ammonium phosphates having an average strength of:

$N_2$: 10 per cent
$P_2O_5$: 52 per cent which is directly projected onto the bed of granulated material in formation in a circuit for producing 20 tons of fertilizer per hour.

Finally, the reactor according to the invention has the following advantages:

Firstly, it is light in weight and occupies less ground space, and

Secondly, it can be easily assembled, dismantled or inspected; it can operate: over a wide range of temperatures, both in the case of reagents and the products, without heat exchange with the exterior, continuously or discontinuously, in any position and at any inclination, even when immersed in a bath of dissolved or melted fertilizer, to which the reactor transmits agitating power; and it makes it possible to obtain a good yield of ammonium phosphates or polyphosphates, when the molecular proportion ($NH_3/H_3PO_4$) is less than or approximately 1.

Finally, although reference is made throughout the description to reactions involving phosphoric acid, the reactor is suitable for any other reaction taking place between two fluids, particularly for reactions involving nitric and sulphuric acids.

We claim:

1. A reactor apparatus, comprising:
   an outer tubular member which is closed at one end thereof and open at the other end thereof; an inner tubular member extending axially from the closed end of said outer tubular member partway toward the open end thereof, said inner tubular member being substantially coaxial with and radially spaced from said outer tubular member and defining therewith an annular zone which opens into a mixing zone beyond the inner end of said inner tubular member, said inner tubular member also having an internal chamber which is closed at its outer end and which opens at its inner end into the mixing zone;
   said outer tubular member having a first tangential inlet into said annular zone whereby a first fluid can be flowed in a tangential direction into said annular zone and can flow in a helical path into said mixing zone;
   said inner tubular member having a second tangential inlet into said internal chamber whereby a second fluid can be flowed in a tangential direction into said internal chamber and can flow in a helical path into said mixing zone;
   an axially movable piston valve disposed adjacent the outer end of said internal chamber and adapted to be moved axially across said second tangential inlet to control the rate of flow of said second fluid into said internal chamber, and displacing means extending through said closed outer end of said internal chamber for moving said piston valve axially within said internal chamber.

2. A reactor apparatus according to claim 1, in which said displacing means comprises a rod having threads thereon which are threadedly engaged from a nut affixed to the outer end of said inner tubular member and a hand wheel attached to the outer end of said rod for rotating same and thereby moving said rod and thereby said piston valve axially in said internal chamber.

3. A reactor apparatus according to claim 1 in which said first and second tangential inlets have first and second pipes respectively connected thereto and extending tangentially from said inner and outer tubular members, said first and second pipes each having two fluid inlets connected thereto, one of said fluid inlets for each pipe being used to supply a reactant fluid and the other being used to supply a preheating fluid.

4. A reactor apparatus according to claim 3, which also includes a third tubular member connected at one end thereof to said other end of said outer tubular member and defining a reaction zone which is coaxial with and of substantially the same size as said mixing zone, and a converging nozzle at the other end of said third tubular member.

* * * * *